(No Model.)

T. R. FERRALL.
ANTI FRICTION BEARING.

No. 250,721. Patented Dec. 13, 1881.

Witnesses
Henry Chadbourne.
F. Allen

Inventor
Thomas R. Ferrall
by Alban Andrew
his atts.

UNITED STATES PATENT OFFICE.

THOMAS R. FERRALL, OF BOSTON, ASSIGNOR TO HERBERT LOUD, OF EVERETT, MASSACHUSETTS.

ANTI-FRICTION BEARING.

SPECIFICATION forming part of Letters Patent No. 250,721, dated December 13, 1881.

Application filed November 9, 1881. (No model.)

*To all whom it may concern:*

Be it known that I, THOMAS R. FERRALL, a citizen of the United States, residing at Boston, in the county of Suffolk and State of Massachusetts, have invented certain new and useful Improvements in Anti-Frictional Bearings; and I do hereby declare that the same are fully described in the following specification and illustrated in the accompanying drawings.

This invention relates to improvements in anti-frictional bearings, and it is constructed in such a manner as to employ cylindrical solid rollers in combination with a notched regulator located within an annular groove in the box or bearing, with or without a central flanged sleeve on the shaft, axle, or pin.

Heretofore anti-frictional bearings have been made with rollers grooved centrally to receive the notched regulator; but such is objectionable on account of the weakness of the rollers, which, on account of the midway grooves, are very liable to be broken, particularly if such grooved rollers are made of brass or soft metal. The notched regulator in my improved anti-frictional bearing serves only for the purpose of keeping the solid rollers a proper distance apart. The ends of the box or bearing serve to prevent undue lateral motion of the rollers, as will be further shown and described, reference being had to the accompanying drawings, on which—

Figure 1:
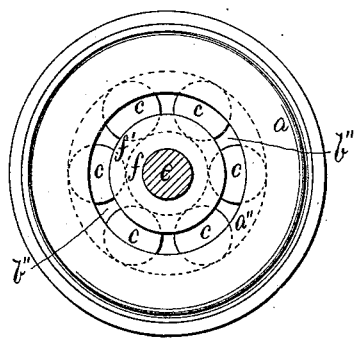
Figure 4:
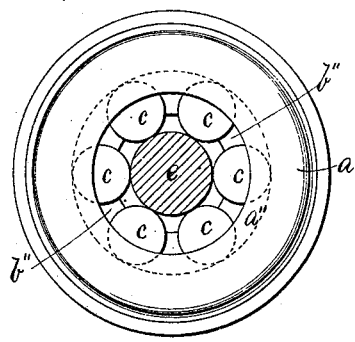
Figure 2:
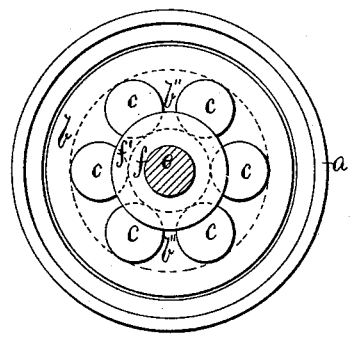
Figure 5:
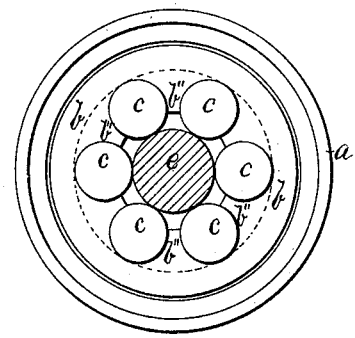
Figure 3:
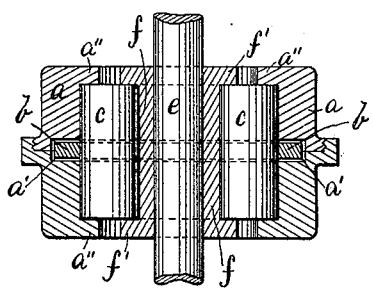
Figure 6:
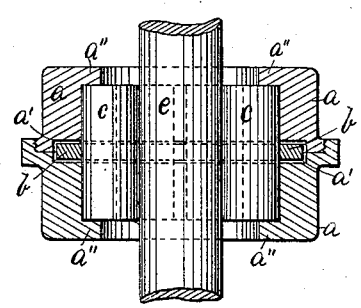
Figure 7:
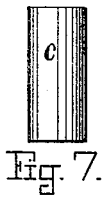
Figure 8:
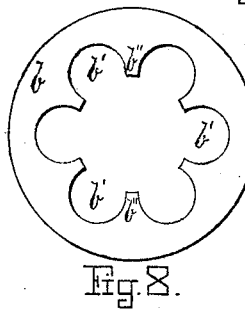

Figure 1 represents an outside elevation of the improved bearing with central flanged sleeve. Fig. 2 represents an interior view of the same with one half of the box removed. Fig. 3 represents a cross-section on the line A B, shown in Fig. 1. Fig. 4 represents an outside view of the improved bearing without central flanged sleeve. Fig. 5 represents an interior view of the same with one half of the box removed; and Fig. 6 represents a cross-section on the line C D, shown in Fig. 4. Fig. 7 represents a detail view of the solid roller, and Fig. 8 represents a plan view of the notched regulator.

Similar letters refer to similar parts wherever they occur on the different parts of the drawings.

$a\ a$ represent the box or bearing, having midway an interior annular groove, $a'$, in which the regulator $b$ is guided loosely. The regulator $b$ is provided with notches $b'\ b'$, for the reception of the solid cylindrical anti-frictional rollers $c\ c\ c$.

$b''\ b''$ are projections on the regulator $b$, projecting inwardly a little beyond the centers of the rollers $c\ c\ c$, by which arrangement the latter are prevented from moving out of their relative positions when the shaft $e$ or central bearing-sleeve, $f$, is removed.

$a''\ a''$ are annular flanges in the opposite ends of the box $a$, to prevent undue lateral motions of the solid cylindrical rollers $c\ c\ c$, as shown.

In Figs. 4, 5, and 6 the rollers $c\ c\ c$ are shown as running directly on the shaft or axle $e$; but in Figs. 1, 2, and 3 a bearing-sleeve, $f$, is located around the shaft $e$, to allow the rollers $c\ c\ c$ to roll upon the outside periphery of said bearing-sleeve, and thereby, if possible, still more reduce the rolling friction. The bearing-sleeve $f$ is provided in its ends with annular flanges $f'\ f'$, to preserve its relative position to the rollers $c\ c\ c$ and box or bearing $a$.

The bearing-sleeve $f$ may be dispensed with, if so desired, and the invention carried out without it, as shown in Figs. 4, 5, and 6.

What I wish to secure by Letters Patent, and claim, is—

1. In an anti-frictional bearing, the box $a$, with its annular groove $a'$ and flanges $a''\ a''$, the solid cylindrical rollers $c\ c\ c$, and regulator $b$, with its notches $b'\ b'$ and intermediate projections, $b''\ b''$, as and for the purpose set forth.

2. In an anti-frictional bearing, the combination of the box $a$, its annular groove $a'$ and flanges $a''\ a''$, the solid cylindrical rollers $c\ c\ c$, notched regulator $b\ b'\ b''$, and central bearing-sleeve, $f$, having flanges $f'\ f'$, as and for the purpose set forth.

In testimony whereof I have affixed my signature in presence of two witnesses.

THOMAS R. FERRALL.

Witnesses:
ALBAN ANDRÉN,
HENRY CHADBOURN.